United States Patent [19]
Chiu

[11] Patent Number: 5,154,435
[45] Date of Patent: Oct. 13, 1992

[54] GRIP WITH AN ANGLE ADJUSTABLE STRUCTURE FOR A GOLF CART

[75] Inventor: Hsiu-Hui Chiu, Tainan, Taiwan

[73] Assignee: Sunshon Molding Co., Ltd., Tainan, Taiwan

[21] Appl. No.: 802,191

[22] Filed: Dec. 4, 1991

[51] Int. Cl.⁵ .............................................. B62B 9/20
[52] U.S. Cl. ...................... 280/47.315; 280/47.371; 280/DIG. 6; 403/97
[58] Field of Search ............ 280/DIG. 6, 646, 47.315, 280/47.371, 287, 47.24; 403/93, 95, 96, 97

[56] References Cited

U.S. PATENT DOCUMENTS

| | | | |
|---|---|---|---|
| 4,262,928 | 4/1981 | Leitzel | 280/DIG. 6 |
| 4,773,503 | 9/1988 | Purfapile | 403/97 |
| 5,106,117 | 4/1992 | Wang | 280/DIG. 6 |

Primary Examiner—David M. Mitchell
Attorney, Agent, or Firm—Morton J. Rosenberg; David I. Klein

[57] ABSTRACT

A grip with an angle adjustable structure for a golf cart comprising a pair of bevel gears to be separated or to be made to engage with each other by releasing up or shoving down a tightening member which then pulls one of the bevel gears to engage with the other to stop the grip at a certain adjusted positions and the grip being able to rotate to any angle with the pulling rod as a pivot when the tightening member is in the released position.

1 Claim, 6 Drawing Sheets

GRIP WITH AN ANGLE ADJUSTABLE STRUCTURE FOR A GOLF CART

BACKGROUND OF THE INVENTION

A conventional golf cart generally has a grip 1 connected firmly with a vertical rod of a golf cart body 2 by means of a socket-shaped connector 11 so that the grip cannot be adjusted in its angle toward the golf cart body 2 to facilitate to pull it along on the ground, as shown in FIG. 6.

SUMMARY OF THE INVENTION

This invention has been devised to supply a grip with an angle adjustable structure for a golf cart, having the following structural features.

1. The grip can be moved to any angle with a pulling rod as a pivot before tightening the grip by pushing a tightening member, so a golf cart provided with this grip can be pulled to move smoothly on the ground.

2. It is provided with a pulling rod to pull two bevel gears in separated condition to engage with each other so as to tighten the grip in any angle in an easy way.

3. It is provided with a tightening member to be moved to pull the pulling rod in the horizontal direction so that the grip can be also moved horizontally to force the two bevel gears to engage with each other.

4. All its components are made separately as a unit so as to be assembled together easily and quickly.

DETAILED DESCRIPTION OF THE INVENTION

Figure 1:
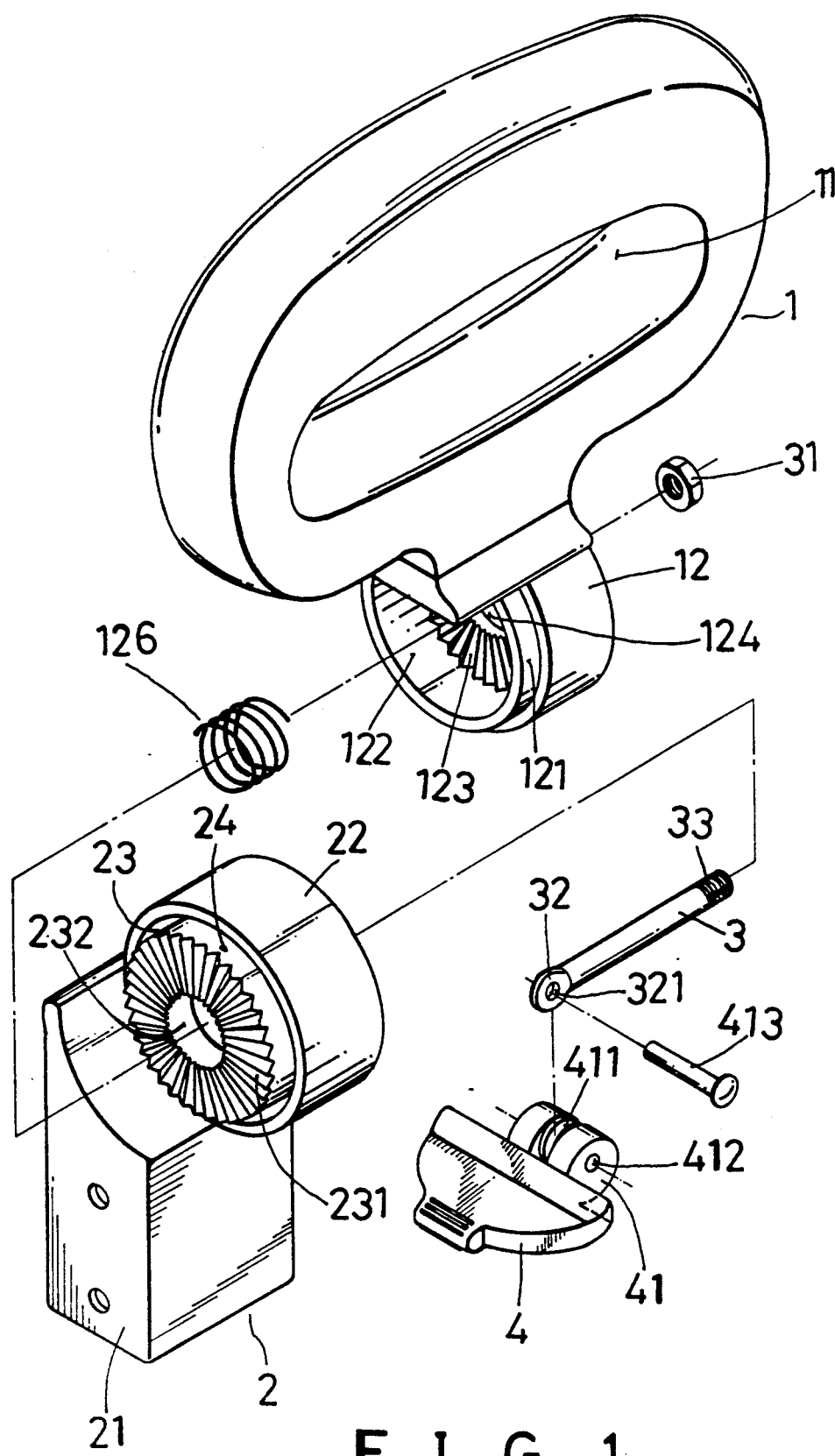
FIG. 1 is an exploded perspective view of the grip with an angle adjustable structure for a golf cart in the present invention.

The grip with an angle adjustable structure for a golf cart in the present invention, as shown in FIGS. 1-5, comprises a grip 1, a connecting block 2, a pulling rod 3 and a tightening member 4 as the main components.

The T-shaped grip 1 has an elongate inner hole 11 for a hand to insert therein, and a projecting ring 12 at the lower portion. The projecting ring 12 is provided with a flange 121 at the left side, a vertical bevel gear 123 around a recessed hole 124 and a through hole 125 in the center of the bevel gear 123. The bottom face of the recessed hole 124 is in contact with one end of a spring 126.

The connecting block 2 has a fitting body 21 bored with a fitting hole 211 to fit with the end of a vertical rod of a golf cart to combine the grip with the golf cart and a connecting ring 22 extending up from a curved surface on the fitting body 21. The connecting ring 22 is also combined with the grip 1, having a bevel gear 231 on the left side of a projecting post 23 inside the connecting ring 22, a recessed hole 232 and a through hole 233, and an annular groove 24 between the projecting post 23 and the outer wall of the ring 22. The recessed hole 232 is for containing the spring 126 having the other end contacting with the bottom of the hole 232.

The pulling rod 3 is to be positioned through the through hole 125 in the grip 1 and the through hole 233 in the connecting block 22, having a ring pivot 32 at the left end to be positioned at the opening of the through hole 233 and a thread portion 33 at the right end to be positioned in the recessed hole 122 to screw with a nut 31 so as to hold the pulling rod 3 in its position.

The tightening member 4 has a semi-circular portion at the left side so as to be manually moved and an actuating ring 41 at the right side. The actuating ring 41 is provided with an annular groove 411 in the middle for the ring pivot 32 in the pulling rod 3 to fit around and a lengthwise through hole 412 eccentrically provided for a rivet 413 to pass through to insert in a hole 321 in the ring pivot 32 and firmly rivetted.

Figure 2:
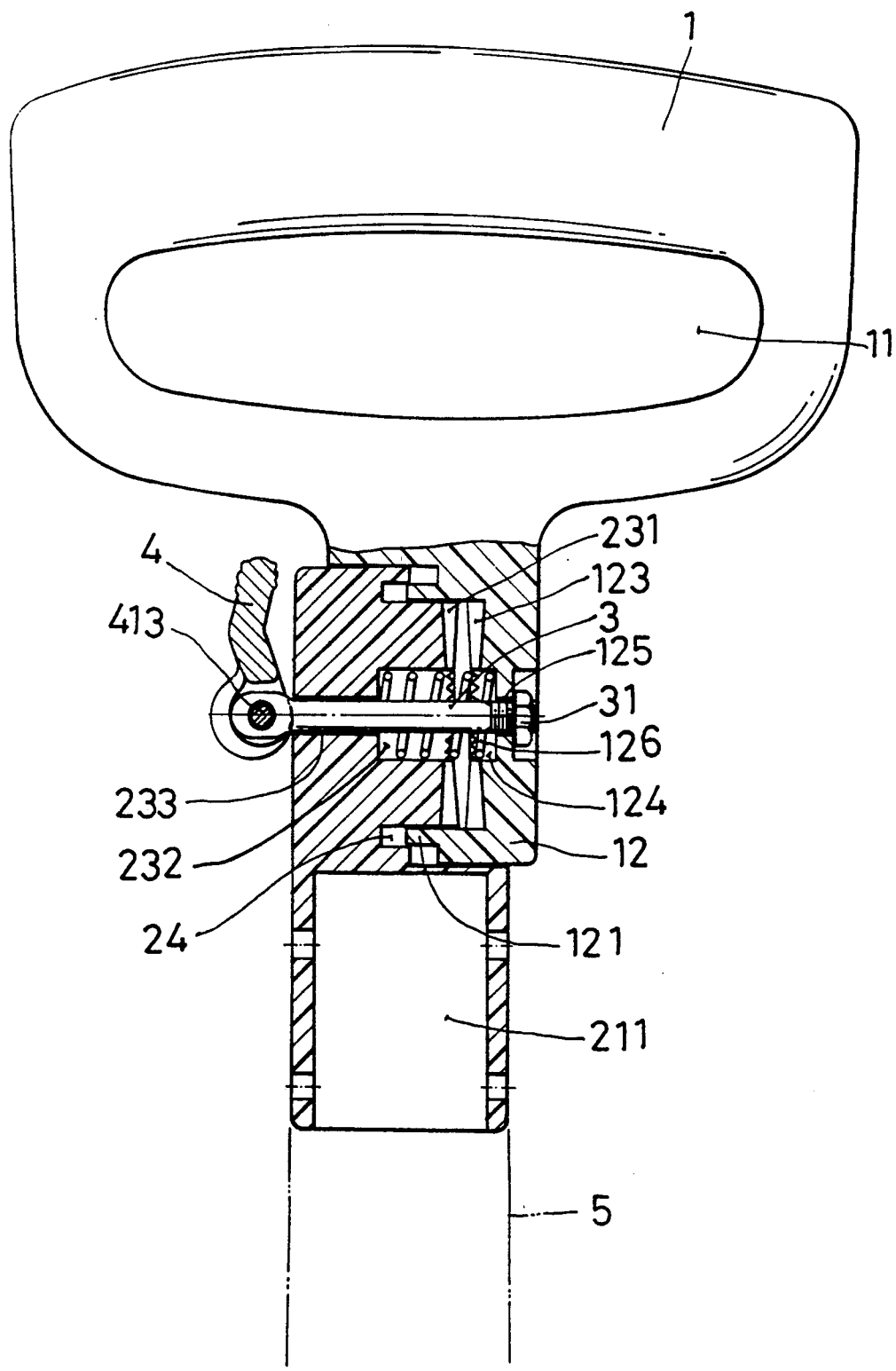
FIG. 2 is a cross-sectional view of the grip with an angle adjustable structure for a golf cart in the present invention.

In assembling together this invention, as shown in FIG. 2, the spring 126 is at first to be placed in the recessed hole 124 in the grip 1, then the connecting ring 22 of the fitting body 21 is held to let the projecting post 23 fit in the cavity 122 in the projecting ring 12, the annular groove 24 fit with the flange 121 and the other end of the spring 126 inserted in the recessed hole 232 to reach its bottom. Next, the ring pivot 32 is to be fitted around the annular groove 411 in the actuating ring 41 of the tightending member 4, and the rivet 413 is inserted through the through hole 412 in the ring 41 and also the through hole 321 in the ring pivot 32 and then rivetted firmly. Lastly, the pulling rod 3 is put through the through hole 233 in the ring 22 and also the through hole 125 in the projecting ring 12 of the grip 1 and a nut 31 is screwed with the thread portion 33, finishing assemblage of the grip with an angle adjustable structure for a golf cart.

Figure 3:
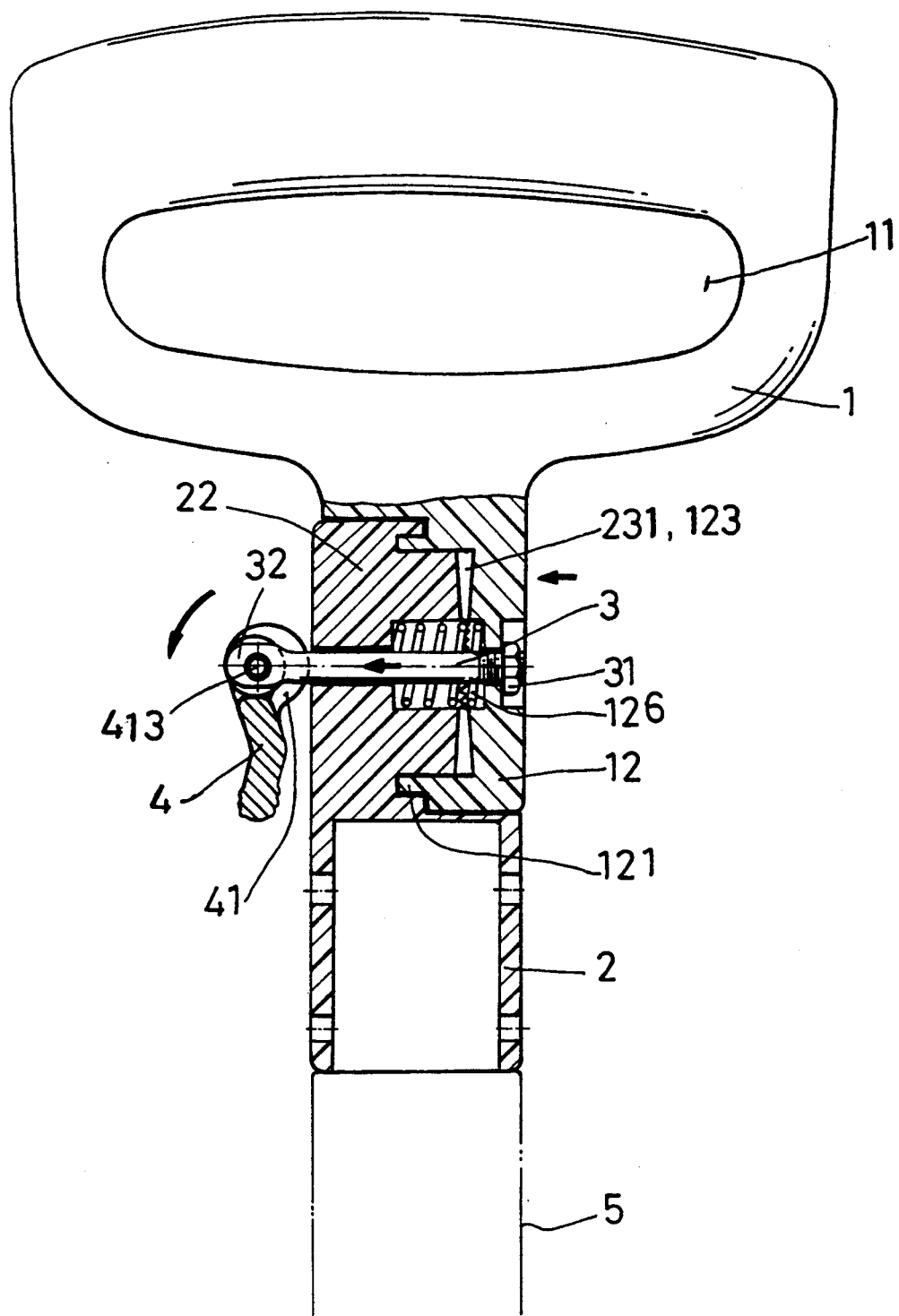
FIG. 3 is a cross-sectional view of the pulling member angle in the present invention.
Figure 4:
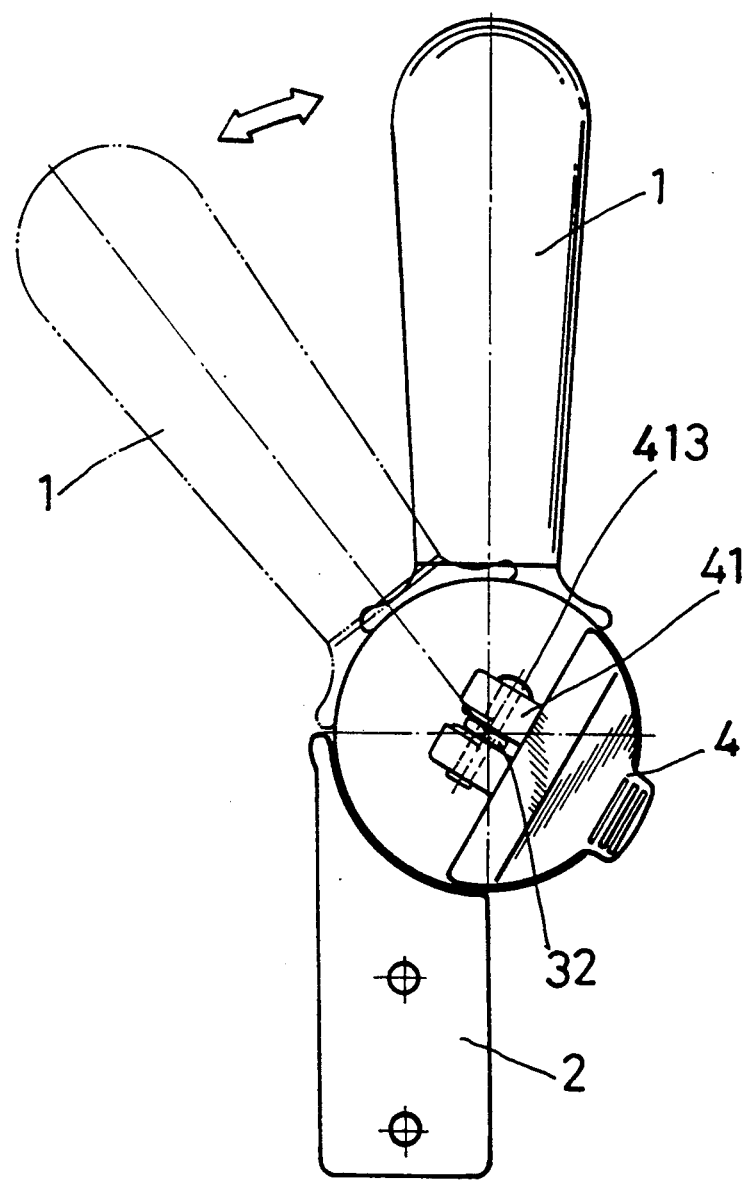
FIG. 4 is a view of the grip having been adjusted in its angle from the dotted line position to the full line position in the present invention.
Figure 5:
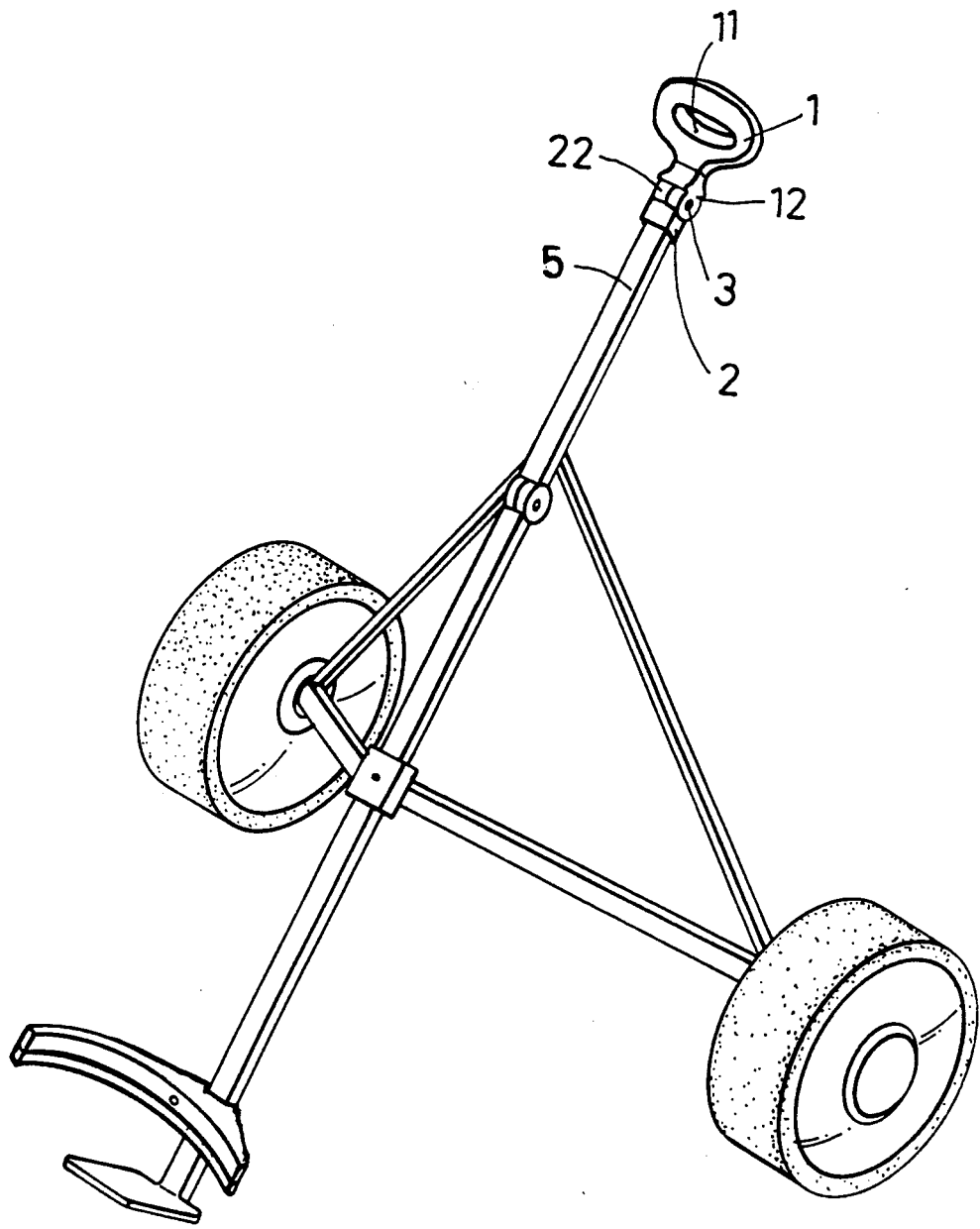
FIG. 5 is a perspective view of a golf cart provided with the grip for a conventional golf cart; and, FIG. 6 is a perspective view of a prior art.
Figure 6:
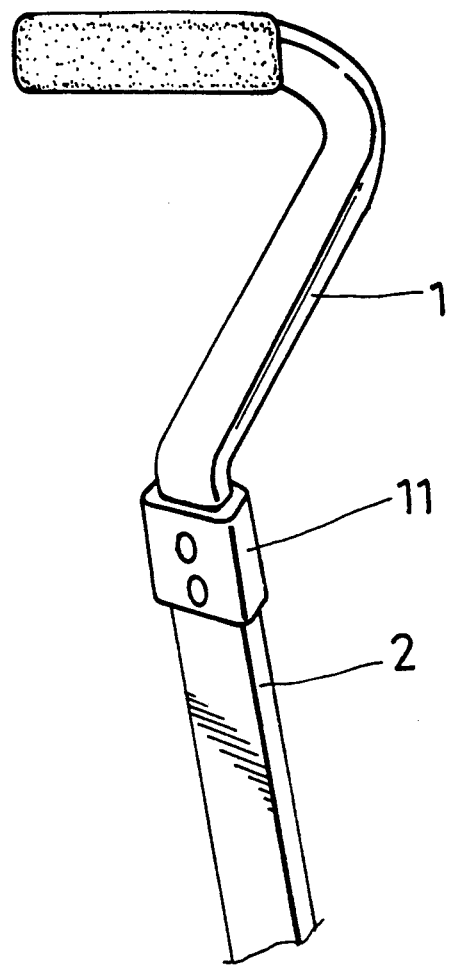

In using this grip, as shown in FIG. 3, it is to be connected with the vertical rod 5 of a golf cart. Under the condition that the tightening member 4 is not tightened, i.e. in the released condition, the bevel gears 123 and 231 are separated from each other by the elasticity of the spring 126, so the grip 1 can move in any angle with the pulling rod 3 as a pivot. If the grip 1 is wanted to be tightened at a certain position or angle, it is moved first to the position wanted, then the tightending member 4 is to be shoved downward by catching the semicircular portion, as shown by the arrow marked in FIG. 3, to let the actuating ring 41 rotate on the side surface of the ring 22 so that the pulling rod 3 is pulled to the left side, forcing the projecting ring 12 with the grip 1 to move laterally to the left side and thus both the bevel gears 123 and 231 come to engage with each other to keep the grip 1 stopped in the position immovable.

What is claimed is:

1. A grip with an angle adjustable structure for a golf cart comprising;

a T-shaped grip having an inner elongate hole for a hand to insert therein and a projecting ring at the lower portion, said projecting ring having (1) an axially extending flange at an inner side, (2) a recessed hole to receive one end of a spring on its bottom face, (3) a through hole in the center for a pulling rod to pass through and (4) a bevel gear around the recessed hole;

a connecting block having a fitting body at the lower portion and a ring extending from an upper curved surface of the fitting body, said fitting body having a square cavity at its lower end, adapted to fit with the golf cart, said ring having a bevel gear on the inwardly facing surface of a projecting post in the ring to engage with the bevel gear in the grip, an annular groove between the projecting post and the outer wall of the ring for the flange in the projecting ring in the grip to fit therein and a central through hole for the pulling rod to extend therein;

a pulling rod to extend in the through hole in the projecting ring of the grip and the through hole in the ring of connecting block, having a ring pivot at the left end for a rivet to insert to be combined with a tightening member and a thread portion at the right end to screw with a nut so that the pulling rod can be held in both the through holes to move therein;

said tightening member having a hand manipulatable portion and an actuating ring attached to the hand manipulatable portion, said actuating ring provided with an annular groove in the middle for the ring pivot in the pulling rod to fit around and an eccentrically located, through hole for a rivet to extend therein and also in a hole in said ring pivot in the pulling rod; and said tightening member being able to be manually rotated to force its ring to rotate and simultaneously to pull horizontally said pulling rod, which then forces said projecting ring of said grip to move axially of the pull rod, said bevel gear in said projecting ring being usually in separated condition from the bevel gear in the ring of said connecting block if said tightening member is not rotated, said bevel gear in the grip moving to engage with the counterpart in the ring of said connecting block to stop firmly said grip at a certain angle if the tightening member is rotated, and said grip being able to rotate to any angle the golf cart when said tightening member is in the released non-rotated position.

* * * * *